US012589581B2

(12) United States Patent
Cho

(10) Patent No.: US 12,589,581 B2
(45) Date of Patent: Mar. 31, 2026

(54) THIN FILM CAPACITOR

(71) Applicant: Meta Synthesis Materials Co., Ltd., Taipei City (TW)

(72) Inventor: Wei-Yu Cho, Taipei City (TW)

(73) Assignee: META SYNTHESIS MATERIALS CO., LTD., Taipei City (TW)

( * ) Notice: Subject to any disclaimer, the term of this patent is extended or adjusted under 35 U.S.C. 154(b) by 128 days.

(21) Appl. No.: 18/433,505

(22) Filed: Feb. 6, 2024

(65) Prior Publication Data

US 2025/0054696 A1 Feb. 13, 2025

(30) Foreign Application Priority Data

Aug. 10, 2023 (TW) ................................ 112130080

(51) Int. Cl.

| | |
|---|---|
| ***B32B 27/28*** | (2006.01) |
| ***B32B 15/20*** | (2006.01) |
| ***H01G 4/20*** | (2006.01) |
| ***H01G 4/33*** | (2006.01) |

(52) U.S. Cl.

CPC ............ *B32B 27/281* (2013.01); *B32B 15/20* (2013.01); *H01G 4/206* (2013.01); *H01G 4/33* (2013.01); *B32B 2250/02* (2013.01); *B32B 2264/105* (2013.01); *B32B 2264/1051* (2020.08); *B32B 2264/108* (2013.01); *B32B 2307/202* (2013.01); *B32B 2457/16* (2013.01)

(58) Field of Classification Search

CPC ... B32B 27/281; B32B 15/20; B32B 2250/02; B32B 2264/105; B32B 2264/1051; B32B 2264/108; B32B 2307/202; B32B 2457/16; H01G 4/206; H01G 4/33; H01G 4/183; H01G 4/14; H01G 4/005; H01G 4/008

See application file for complete search history.

(56) References Cited

U.S. PATENT DOCUMENTS

| | | | | | |
|---|---|---|---|---|---|
| 6,259,125 | B1 | 7/2001 | Fazan et al. | | |
| 6,288,890 | B1 * | 9/2001 | Saito | ........................ | H01G 4/18 361/523 |
| 6,519,136 | B1 | 2/2003 | Chu et al. | | |
| 7,609,504 | B2 | 10/2009 | Park et al. | | |
| 8,385,051 | B2 | 2/2013 | Nakayama et al. | | |
| 8,675,345 | B2 | 3/2014 | Tatemichi et al. | | |

(Continued)

FOREIGN PATENT DOCUMENTS

| | | | | |
|---|---|---|---|---|
| CN | 108257783 A * | 7/2018 | ............. | H01G 4/005 |
| TW | 202328298 A | 7/2023 | | |

OTHER PUBLICATIONS

Office Action issued by Taiwan Intellectual Property Office on Oct. 14, 2024.

*Primary Examiner* — John D Freeman
(74) *Attorney, Agent, or Firm* — WPAT, PC

(57) ABSTRACT

A thin film capacitor is provided. The thin film capacitor includes a dielectric layer and a conductive layer. The dielectric layer includes polyimide and conductive particles. The polyimide includes ether linkages. Based on 100 weight parts of the polyimide, a total amount of monomer units including the ether linkages is 50 weight parts to 100 weight parts. Based on 100 weight parts of the dielectric layer, a total amount of the conductive particles is 10 weight parts to 70 weight parts. The conductive layer is disposed on a surface of the dielectric layer.

10 Claims, 1 Drawing Sheet

(56) References Cited

U.S. PATENT DOCUMENTS

| | | | | |
|---|---|---|---|---|
| 8,871,850 | B2 | 10/2014 | Koh et al. | |
| 9,390,857 | B2 | 7/2016 | Tan et al. | |
| 9,679,699 | B2 | 6/2017 | Kamigaki | |
| 2006/0256503 | A1 | 11/2006 | Kato et al. | |
| 2007/0001258 | A1* | 1/2007 | Aihara | H01G 4/008<br>257/528 |
| 2009/0121195 | A1* | 5/2009 | Lee | H05K 1/162<br>252/514 |
| 2010/0110608 | A1 | 5/2010 | Wei et al. | |
| 2017/0174838 | A1* | 6/2017 | Suh | H05K 3/00 |
| 2018/0265655 | A1* | 9/2018 | Sanner | B32B 15/08 |

* cited by examiner

THIN FILM CAPACITOR

This application claims the benefit of Taiwan application Serial No. 112130080, filed Aug. 10, 2023, the subject matter of which is incorporated herein by reference.

TECHNICAL FIELD

This disclosure relates to a thin film capacitor. More particularly, this disclosure relates to a thin film capacitor with a two-layered structure.

BACKGROUND

Thin film capacitors are one of the most common types for capacitor use in electronic equipment. Thin film capacitors have no polarity, and thus can be used in applications of AC and power supply. Thin film capacitors can hold a large amount of charge for a longer period than other types of capacitors. It means that thin film capacitors can have longer lives. In addition, thin film capacitors are stable, reliable, and having lower cost than some other types of capacitors for the same applications.

Typical thin film capacitors have three-layered structure, in which a plastic thin film is used as a dielectric layer, and two metal foils are attached on two sides of the plastic thin film and used as electrodes. Materials usually used for the plastic thin film comprises polypropylene (PP), polyphenylene sulfide (PPS), and polyethylene terephthalate (PET). Characteristics of the thin film capacitors can be adjusted by using different types of plastic thin film. Generally, thin film capacitors with PP, PPS, or PET dielectric layers are applicable for a working temperature from −55° C. to 125° C. and have dielectric constants of about 2 to 4.

SUMMARY

In this disclosure, an improved thin film capacitor is provided.

The thin film capacitor according to the disclosure comprises a dielectric layer and a conductive layer. The dielectric layer comprises polyimide and conductive particles. The polyimide comprises ether linkages. Based on 100 weight parts of the polyimide, a total amount of monomer units comprising the ether linkages is 50 weight parts to 100 weight parts. Based on 100 weight parts of the dielectric layer, a total amount of the conductive particles is 10 weight parts to 70 weight parts. The conductive layer is disposed on a surface of the dielectric layer.

With the dielectric layer comprising the polyimide having said ether linkages and the conductive particles as described above, the thin film capacitor according to the disclosure can have improved properties and a simplified and thus thinner structure.

Figure 1A:
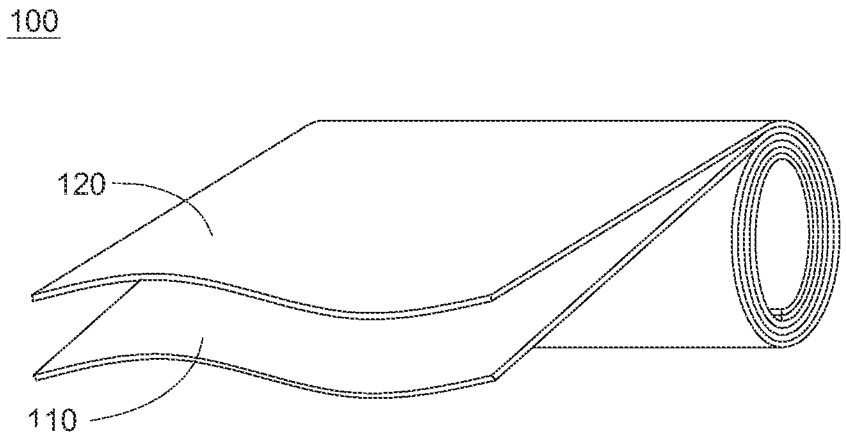
FIGS. 1A-1B show a thin film capacitor according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. The description and the drawings are provided for illustrative only, and not intended to result in a limitation. Spatially related terms, such as “on”, “under”, “on the left of”, “on the right of”, “in front of”, “in behind of”, and the like, can be used to simplify the illustration of the relationship between elements. However, it should be understood that in addition to the orientation shown in the drawings, the spatially related terms should also encompass the orientation of objects in different situations. For example, if one element is originally positioned on another element, it will become under the another element if the object is turned upside down. In addition, for clarity, the elements may not be drawn to scale. Some elements and/or reference numerals may be omitted from some drawings. It is contemplated that the elements and features of one embodiment can be beneficially incorporated in another embodiment without further recitation.

Figure 1B:
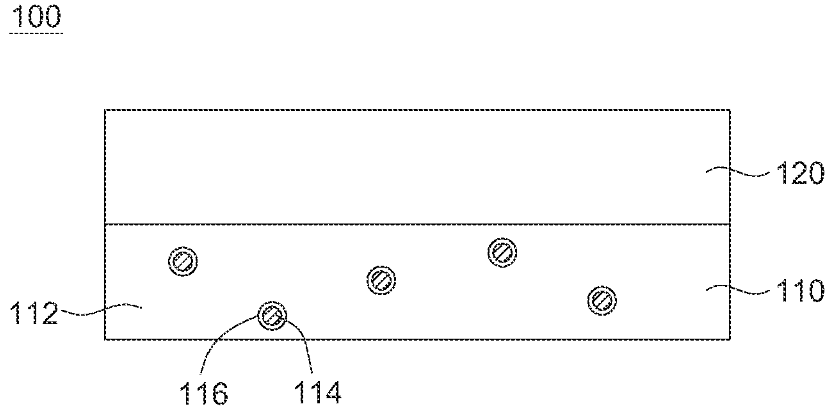

Referring to FIGS. 1A-1B, a thin film capacitor 100 according to the disclosure is shown. The thin film capacitor 100 comprises a dielectric layer 110 and a conductive layer 120. The dielectric layer 110 comprises polyimide 112 (as a matrix) and conductive particles 114. The polyimide 112 comprises ether linkages. Based on 100 weight parts of the polyimide 112, a total amount of monomer units comprising the ether linkages is 50 weight parts to 100 weight parts. Based on 100 weight parts of the dielectric layer 110, a total amount of the conductive particles 114 is 10 weight parts to 70 weight parts. The conductive layer 120 is disposed on a surface of the dielectric layer 110.

The dielectric layer 110 uses the polyimide 112 as a matrix. The polyimide 112 can be synthesized from diamine monomers and dianhydride monomers in an organic solvent. In such a condition, the polyimide 112 can comprise diamine monomer units and dianhydride monomer units, and the diamine monomer units and/or the dianhydride monomer units comprise the ether linkages. The ether linkages can be included in backbones of the diamine monomer units and/or the dianhydride monomer units. In the synthesis of the polyimide, the proportion of one kind of monomers and the monomer units formed therefrom is approximately the same, because only one water molecule ($H_2O$) is removed when an amine group reacts with an anhydride group to form an imide group. As such, the proportion of the monomer units can be simply estimated from the proportion of the monomers. In other words, when a total weight of the diamine monomers comprising the ether linkages and the dianhydride monomers comprising the ether linkages accounts for 50% to 100% of a total weight of all the diamine monomers and the dianhydride monomers used to form the polyimide 112, it can be said that based on 100 weight parts of the polyimide 112, a total amount of the monomer units comprising the ether linkages is 50 weight parts to 100 weight parts.

Specifically, the diamine monomer units comprising the ether linkages can be monomer units independently formed from monomers represented by Formula (1) or Formula (2):

Formula (1)

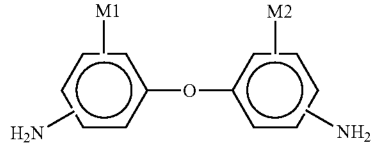

-continued

Formula (2)

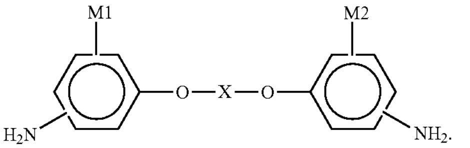

In Formula (1), M1 and M2 are independently H, OR1, or R1, R1 is $C_nF_mH_{2n+1-m}$, n is an integer from 1 to 8, and m is an integer from 0 to 17. In Formula (2), M1 and M2 are independently H, OR1, or R1, R1 is $C_nF_mH_{2n+1-m}$, n is an integer from 1 to 8, m is an integer from 0 to 17, and X is represented by any of Formula (2-1) to Formula (2-8):

Formula (2-1)

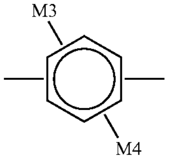

Formula (2-2)

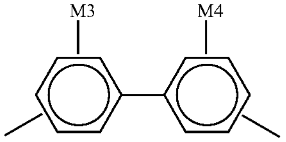

Formula (2-3)

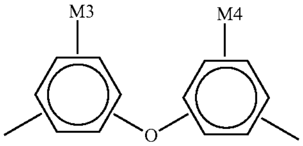

Formula (2-4)

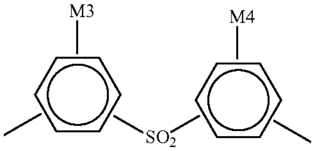

Formula (2-5)

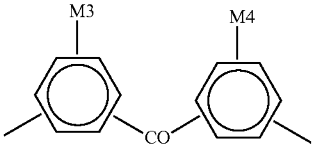

Formula (2-6)

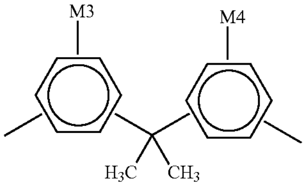

Formula (2-7)

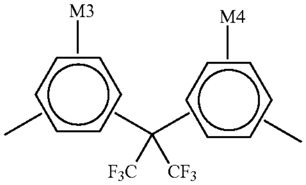

-continued

Formula (2-8)

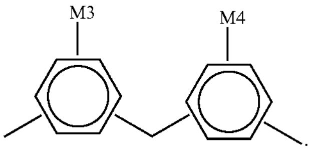

In each of Formula (2-1) to Formula (2-8), M3 and M4 are independently H, OR1, or R1, R1 is $C_nF_mH_{2n+1-m}$, n is an integer from 1 to 8, and m is an integer from 0 to 17. For example, the diamine monomer units can comprise monomer units formed from at least one of diaminodiphenyl ether as represented by Formula (1-I), Formula (1-II), or Formula (1-III), 4,4'-diamino-2-(trifluoromethyl)diphenyl ether represented by Formula (1-IV),4,4'-diamino-2-(trifluoromethoxyl)diphenyl ether as represented by Formula (1-V), 4,4'-diamino-2,2'-bis(trifluoromethyl)diphenyl ether as represented by Formula (1-VI),4,4'-diamino-2,2'-bis(trifluoromethoxyl)diphenyl ether as represented by Formula (1-VII), bis(4-aminophenoxy)benzene as represented by Formula (2-I) or Formula (2-II), 1,3-bis(3-aminophenoxy) benzene as represented by Formula (2-III), 1,4-bis{4-amino-2-(trifluoromethyl)phenoxy}benzene as represented by Formula (2-IV), 1,4-bis(4-aminophenoxy)-2,5-di-t-butylbenzene (DTBAB) as represented by Formula (2-V), 2,2-bis{4-(4-aminophenoxy)phenyl}propane as represented by Formula (2-VI), 2,2-bis{4-(4-aminophenoxy) phenyl}methane as represented by Formula (2-VII), 2,2-bis{4-(4-aminophenoxy)phenyl}hexafluoropropane as represented by Formula (2-VIII), 2,2-bis[4-{4-amino-2-(trifluoromethyl)phenoxy}phenyl]hexafluoropropane as represented by Formula (2-IX), 2,2-bis[4-{4-amino-2-(trifluoromethoxyl)phenoxy}phenyl]hexafluoropropane as represented by Formula (2-X), 4,4'-bis(4-aminophenoxy)biphenyl as represented by Formula (2-XI), bis{4-(aminophenoxy)phenyl}sulfone as represented by Formula (2-XII) or Formula (2-XIII), or bis{4-(4-aminophenoxy) phenyl}ketone as represented by Formula (2-XIV):

Formula (1-I)

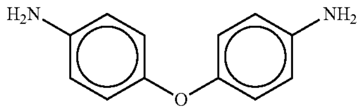

Formula (1-II)

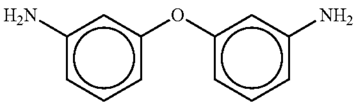

Formula (1-III)

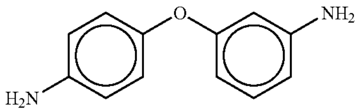

Formula (1-IV)

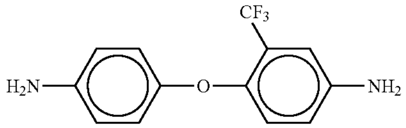

Formula (1-V)

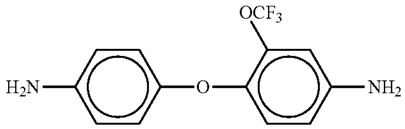

-continued

Formula (1-VI)

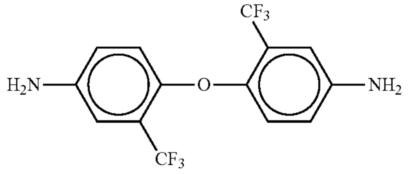

Formula (1-VII)

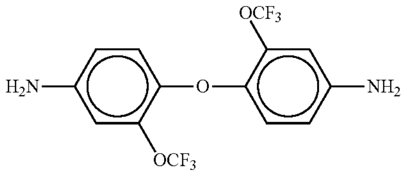

Formula (2-I)

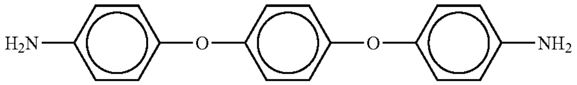

Formula (2-II)

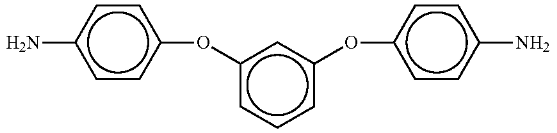

Formula (2-III)

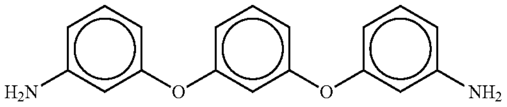

Formula (2-IV)

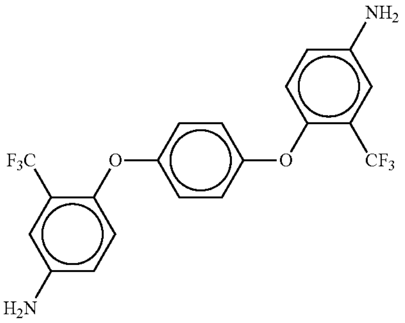

Formula (2-V)

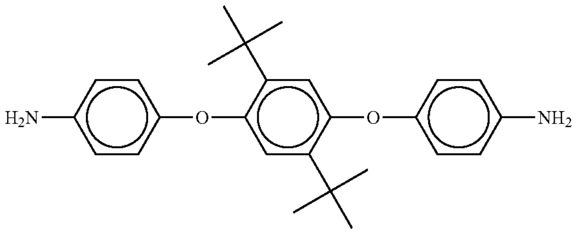

Formula (2-VI)

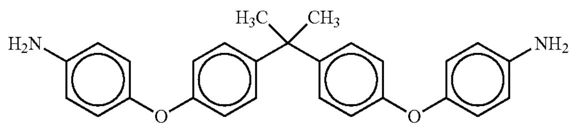

-continued

Formula (2-VII)

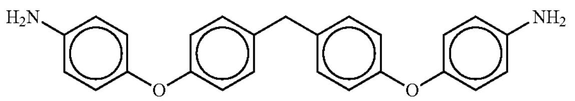

Formula (2-VIII)

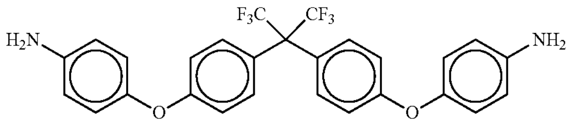

Formula (2-IX)

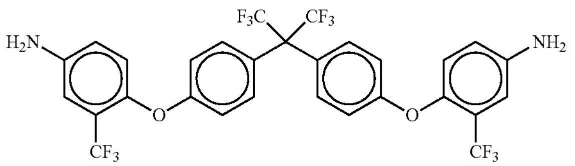

Formula (2-X)

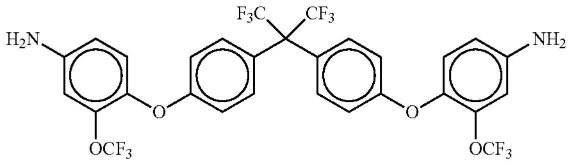

Formula (2-XI)

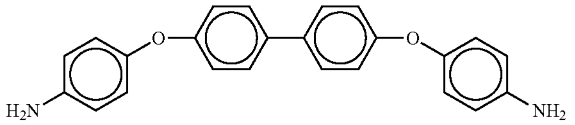

Formula (2-XII)

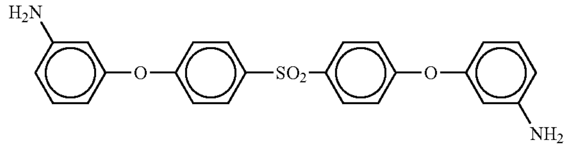

Formula (2-XIII)

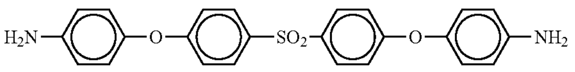

Formula (2-XIV)

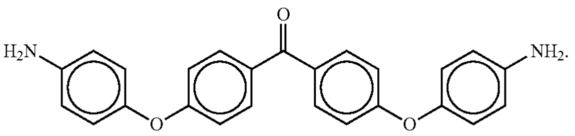

It is understood that the monomers represented by Formula (1-I) to Formula (1-VII) belong to the monomers represented by Formula (1), and the monomers represented by formula (2-I) to formula (2-XIV) belong to the monomers represented by Formula (2). The diamine monomers used to synthesize the polyimide 112 can comprise the monomers described above represented by the Formula (1) and/or Formula (2).

The dianhydride monomer units comprising the ether linkages can be monomer units independently formed from monomers represented by Formula (3) or Formula (4):

Formula (3)

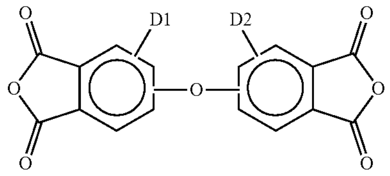

Formula (4)

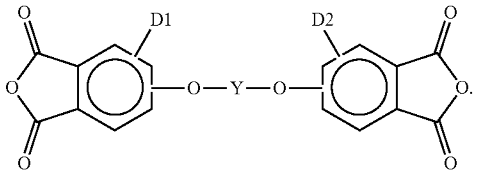

In Formula (3), D1 and D2 are independently H, OR2, or R2, R2 is $C_nF_mH_{2n+1-m}$, n is an integer from 1 to 8, and m is an integer from 0 to 17. In Formula (4), D1 and D2 are independently H, OR2, or R2, R2 is $C_nF_mH_{2n+1-m}$, n is an integer from 1 to 8, m is an integer from 0 to 17, and Y is represented by any of Formula (4-1) to Formula (4-8):

Formula (4-1)

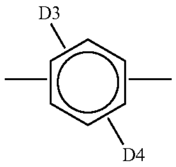

Formula (4-2)

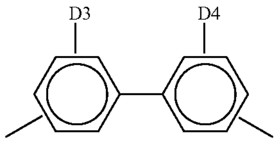

Formula (4-3)

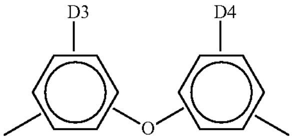

Formula (4-4)

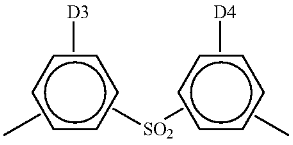

Formula (4-5)

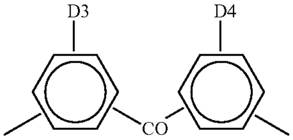

Formula (4-6)

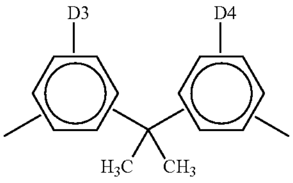

-continued

Formula (4-7)

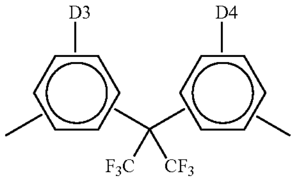

Formula (4-8)

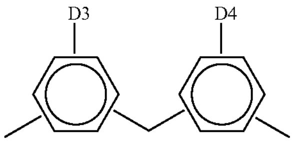

.

In each of Formula (4-1) to Formula (4-8), D3 and D4 are independently H, OR2, or R2, R2 is $C_nF_mH_{2n+1-m}$, n is an integer from 1 to 8, and m is an integer from 0 to 17. For example, the dianhydride monomer units can comprise monomer units formed from at least one of oxydiphthalic anhydride (ODPA) as represented by Formula (3-I) or Formula (3-II), oxydimethylphthalic anhydride as represented by Formula (3-III) or Formula (3-IV), bisphenol A dianhydride as represented by Formula (4-I), tetramethyl bisphenol A dianhydride as represented by Formula (4-II), bisphenol F dianhydride as represented by Formula (4-III), or tetramethyl bisphenol F dianhydride as represented by Formula (4-IV):

Formula (3-I)

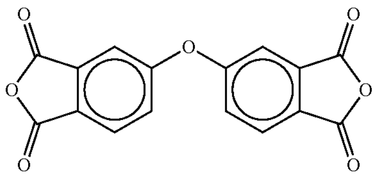

Formula (3-II)

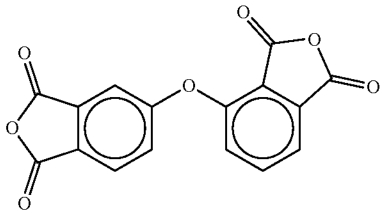

Formula (3-III)

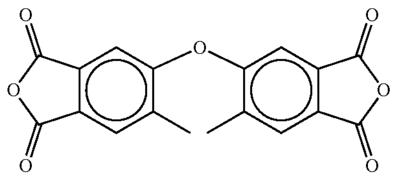

Formula (3-IV)

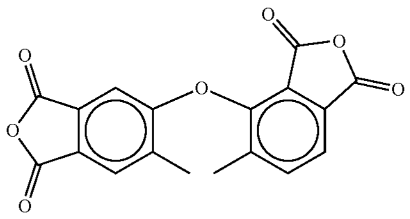

-continued

Formula (4-I)

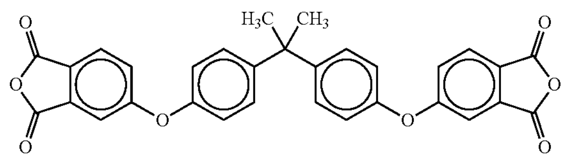

Formula (4-II)

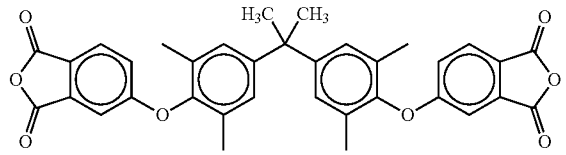

Formula (4-III)

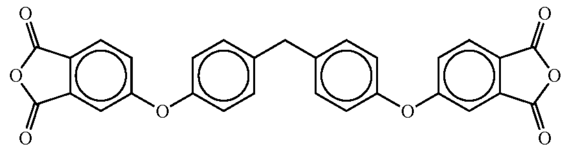

Formula (4-IV)

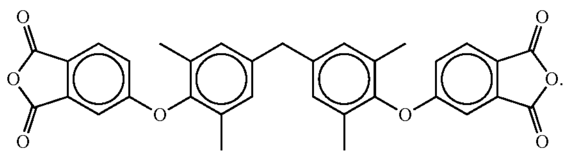

Among them, the monomer represented by Formula (3-I) is generally referred to as 4-4'-oxydiphthalic anhydride (4-4'-ODPA), and the monomer represented by formula (3-II) is generally referred to as 3-4'-oxydiphthalic anhydride (3-4'-ODPA). It is understood that the monomers represented by Formula (3-I) to Formula (3-IV) belong to the monomers represented by Formula (3), and the monomers represented by Formula (4-I) to Formula (4-IV) belong to the monomers represented by Formula (4). The dianhydride monomers used to synthesize the polyimide 112 can comprise the monomers described above represented by the Formula (3) and/or Formula (4).

It is understood that the monomers used to synthesize the polyimide 112 can be mixedly used. In other words, the diamine monomer units of the polyimide 112 can come from only one kind of monomer represented by Formula (1), from several kinds of monomers represented by Formula (1), from only one kind of monomer represented by Formula (2), from several kinds of monomers represented by Formula (2), or from one or more kinds of monomers represented by Formula (1) and one or more kinds of monomers represented by Formula (2). Similarly, the dianhydride monomer units of the polyimide 112 can come from only one kind of monomer represented by Formula (3), from several kinds of monomers represented by Formula (3), from only one kind of monomer represented by Formula (4), from several kinds of monomers represented by Formula (4), or from one or more kinds of monomers represented by Formula (3) and one or more kinds of monomers represented by Formula (4). Also, the polyimide 112 can comprise only one kind of diamine monomer unit and only one kind of dianhydride monomer unit, comprise only one kind of diamine monomer unit but several kinds of dianhydride monomer units, comprise several kinds of diamine monomer units but only one kind of dianhydride monomer unit, or comprise several kinds of diamine monomer units and several kinds of dianhydride monomer units. It is understood that the polyimide 112 can comprise other kinds of diamine monomer units (including diamine monomer units that do not include ether linkages), other kinds of dianhydride monomer units (including dianhydride monomer units that do not include ether linkages), even monomer units other than diamine monomer units and dianhydride monomer units, as long as the effect of the disclosure is not affected. Also, the other compositions that will be described in following paragraphs can also be mixedly used, as long as the effect of the disclosure is not affected.

The organic solvent used to synthesize the polyimide 112 can comprise at least one of N-methyl-2-pyrrolidone (NMP), N,N-dimethylacetamide (DMAC), 1,3-dimethyl-2-imidazolidinone (DMI), N,N-dimethylformamide (DMF), sulfolane, γ-butyrolactone (GBL), dimethyl sulfoxide (DMSO), m-cresol, hexamethylphosphoramide (HMPA), cyclopentanone (CPN), cyclohexanone (CHN), diglyme, or triglyme, but not limited thereto.

The conductive particles 114 are dispersed in the matrix of the polyimide 112. The conductive particles 114 can comprise at least one of Au, Ag, Cu, Fe, Co, Ni, Al, Mn, Zn, Pb, Mg, Ti, carbon black, or graphene, but not limited thereto. The conductive particles have particle sizes, for example, from 10 nm to 5 μm. Different conductive particles 114 can have different particle sizes, and the particle size distribution in the range from 10 nm to 5 μm can be adjusted.

The dielectric layer 110 can be obtained by dispersing the conductive particles 114 into the polyimide 112 in an organic solvent. In some further embodiments, a dispersing agent can be used. Firstly, the conductive particles 114, the organic solvent, and the dispersing agent are well mixed. Then, a polyimide solution is added and mixed uniformly to form a dielectric layer coating. The dielectric layer coating is coated, heated for baking, and then cooled to room temperature to obtain the dielectric layer 110. The organic solvent can comprise at least one of N-methyl-2-pyrrolidone (NMP), N,N-dimethylacetamide (DMAC), 1,3-dimethyl-2-imidazolidinone (DMI), N,N-dimethylformamide (DMF), sulfolane, γ-butyrolactone (GBL), dimethyl sulfoxide (DMSO), m-cresol, hexamethylphosphoramide (HMPA), cyclopentanone (CPN), cyclohexanone (CHN), diglyme, or triglyme, but not limited thereto.

In a condition that the dispersing agent is used in the preparation of the dielectric layer 110, as shown in FIG. 1B, the dielectric layer 110 can further comprise a dispersing agent 116, and the conductive particles 114 can be dispersed in the matrix of the polyimide 112 with the dispersing agent 116.

The dispersing agent 116 can comprise a coupling agent and an organic dispersing agent. The coupling agent can comprise at least one of aluminum monostearate, aluminum distearate, isopropoxyaluminum distearate, aluminum tristearate, titanium tris(dodecylbenzenesulfonate) isopropoxide, titanium triisostearoylisopropoxide, isopropyl tristearyl titanate, tetrabutyl orthotitanate tetramer, (3-aminopropyl)triethoxysilane, (3-glycidyloxypropyl) trimethoxysilane, 3-(trimethoxysilyl) propyl methacrylate, 3-isocyanatopropyl triethoxysilane, trimethoxyphenylsilane, N-phenyl-3-aminopropyltrimethoxysilane, 3-acryloxypropyltrimethoxysilane, or p-styryltrimethoxysilane, but not limited thereto.

The organic dispersing agent can comprise at least one of polyoxyethylene lauryl ether phosphate, polyethylene, polypropylene, polystyrene, polyvinyl alcohol, polyethylene glycol, tris(2-ethylhexyl)phosphate, cellulose or its derivative, polyacrylamide, or polyethylene glycol distearate, but not limited thereto. Said cellulose or its derivative is, for example, methyl cellulose, ethyl cellulose, hydroxypropyl cellulose, hydroxypropylmethyl cellulose, or carboxymethyl cellulose, but not limited thereto.

The polyimide 112 can be a polyimide soluble in the organic solvent. Such a polyimide is softer than a polyimide that is insoluble in an organic solvent and is suitable for forming a roll.

According to the disclosure, the main materials of the dielectric layer 110 are the polyimide having the ether linkages and the conductive particles. Compared with PP, PPS, and PET, the polyimide having the ether linkages has better heat resistance, frost resistance, dielectric properties, mechanical properties, and processability. For example, since the polyimide having the ether linkages has better heat resistance, the upper limit of the working temperature can be further increased by using the dielectric layer 110 according to the disclosure. The thin film capacitor 100 according to the disclosure is applicable for a working temperature from −55° C. to 200° C. The addition of the conductive particles can increase the dielectric constant (Dk) of the dielectric layer, increase the storage capacity of the thin film capacitor, and is beneficial for shrinking the thin film capacitor. The dielectric layer 110 according to the disclosure has a dielectric constant equal to or larger than 6, and can be promoted to equal to or larger than 8 in preferred conditions. In addition, the addition of the dispersing agent can decrease dielectric loss (Df). The dielectric layer 110 according to the disclosure has a dielectric loss lower than 1.

The conductive layer 120 is disposed on a surface of the dielectric layer 110. In FIGS. 1A-1B, the conductive layer 120 is disposed over the dielectric layer 110. When a roll is formed, the conductive layer 120 can be positioned outside the dielectric layer 110. However, it is understood that the conductive layer 120 can be disposed below the dielectric layer 110. In such a condition, when a roll similar to that shown in FIG. 1A is formed, the conductive layer 120 can be positioned inside the dielectric layer 110.

Because the improvement in the electrical properties of the dielectric layer 110, the thin film capacitor 100 according to the disclosure can be formed as a roll with a two-layered structure of the dielectric layer 110 and the conductive layer 120, and a third layer is unneeded. In the condition that the structure is simplified, the thin film capacitor can become thinner, and this is also beneficial for shrinking the thin film capacitor.

To assist the understanding of the disclosure, specific Examples and Comparative Examples will be provided in following paragraphs for further illustration.

Synthesis of Polyimide

Referring to Table 1, according to each of the proportion of Synthesis Example 1 to Synthesis Example 4, m-cresol (CAS: 108-39-4) solvent, 4,4'-methylene-bis(2-methylaniline) (MDA; CAS: 838-88-0; a diamine monomer without an ether linkage), 3,4'-diaminodiphenylmethane (DADPM; CAS: 19430-83-2; a diamine monomer without an ether linkage), 1,4-bis(4-aminophenoxy)-2,5-di-t-butylbenzene (DTBAB; CAS: 189344-59-0; a diamine monomer with an ether linkage in the backbone), 3,4'-biphthalic anhydride (a-BPDA; CAS: 36978-41-3; a dianhydride monomer without an ether linkage), 4,4'-bis(phthalic anhydride) sulfide (TPDA; CAS: 25884-43-9; a dianhydride monomer without an ether linkage), and 3,4'-oxydiphthalic anhydride (3,4'-ODPA; CAS: 50662-95-8; a dianhydride monomer with an ether linkage in the backbone) were added to a four-neck reaction flask. Then, the four-neck reaction flask was equipped with a thermometer, a condenser tube, a Dean-Stark trap, a stirring rod, a titration funnel, and a heater. Nitrogen gas was flowed into the four-neck reaction flask with a flow rate of 500 cc/min. The stirring rate was kept at 100 rpm. Then, isoquinoline (CAS: 119-65-3) catalyst was added into the four-neck reaction flask through the titration funnel. The temperature of the reaction mixture was increased to 200° C. After 6 hours of the reaction, the heating was stopped to cool down the reaction mixture. Then, the reaction mixture was poured out. As the products, Polyimide Solution PI-A, Polyimide Solution PI-B, Polyimide Solution PI-C, and Polyimide Solution PI-D were obtained, which correspond to Synthesis Example 1, Synthesis Example 2, Synthesis Example 3, and Synthesis Example 4, respectively. Total weights and solid contents of Polyimide Solution PI-A, Polyimide Solution PI-B, Polyimide Solution PI-C, and Polyimide Solution PI-D are also listed in Table 1.

TABLE 1

| | Synthesis Example 1 (PI-A) | | Synthesis Example 2 (PI-B) | | Synthesis Example 3 (PI-C) | | Synthesis Example 4 (PI-D) | |
|---|---|---|---|---|---|---|---|---|
| | weight (g) | mol | weight (g) | mol | weight (g) | mol | weight (g) | mol |
| m-cresol | 470.71 | | 488.28 | | 491.48 | | 401.06 | |
| MDA | | | 63.37 | 0.28 | | | 47.53 | 0.21 |
| DADPM | 5.95 | 0.03 | 23.79 | 0.12 | | | | |
| DTBAB | 109.23 | 0.27 | | | 121.36 | 0.30 | 36.41 | 0.09 |
| a-BPDA | 70.61 | 0.24 | | | | | 52.96 | 0.18 |
| TPDA | 19.58 | 0.06 | 13.05 | 0.04 | | | | |
| 3-4'-ODPA | | | 111.68 | 0.36 | 93.06 | 0.30 | 37.23 | 0.12 |
| isoquinoline | 8.47 | | 6.12 | | 8.84 | | 5.22 | |
| amount of the monomers having the ether linkages among all the monomers | 53.2% | | 52.7% | | 100.0% | | 42.3% | |
| total weight (g) | 684.55 | | 706.30 | | 714.75 | | 580.40 | |
| solid content (%) | 30.0% | | 30.0% | | 30.0% | | 30.0% | |

[Effect of the Amount of Monomers/Monomer Units Having Ether Linkages]

[Preparation of Dielectric Layer Coating]

5 g of trimethoxyphenylsilane (CAS: 2996-92-1) and 45 g of m-cresol solvent were mixed to form a 10 wt % trimethoxyphenylsilane solution. Alternatively, 5 g of tris(2-ethylhexyl)phosphate (CAS: 78-42-2) and 45 g of m-cresol solvent were mixed to form a 10 wt % tris(2-ethylhexyl)phosphate solution. Referring to Table 2, according to each of the proportions of Preparation Example 1 to Preparation Example 4, silver powders, m-cresol, and 10 wt % trimethoxyphenylsilane solution or tris(2-ethylhexyl) phosphate solution were mixed. The mixture was stirred at room temperature for 24 hours with the stirring rate kept at 200 rpm. Then, Polyimide Solution PI-A, Polyimide Solution PI-B, Polyimide Solution PI-C, or Polyimide Solution PI-D was added, the stir was continued for 1 hour. As such, Dielectric Layer Coating a, Dielectric Layer Coating b, Dielectric Layer Coating c, and Dielectric Layer Coating d were obtained, which correspond to Preparation Example 1, Preparation Example 2, Preparation Example 3, and Preparation Example 4. In summary, Preparation Example 1 to Preparation Example 4 use the polyimide solution PI-A to polyimide solution PI-D synthesized as described above to prepare Dielectric Layer Coating a to Dielectric Layer Coating d. Total weights, solid contents, the amounts of the silver powders, and viscosities at 25° C. of the dielectric layer coatings are also listed in Table 2. The measurement method of the viscosities of the dielectric layer coatings is according to the regulation of JIS K 5400:1990 to use a viscometer (Viscolead one, Fungilab) to measure the viscosity of each of Dielectric Layer Coating a to Dielectric Layer Coating d at 25° C., and the unit of viscosity is cP.

TABLE 2

| | Preparation Example 1 Dielectric Layer Coating a weight (g) | Preparation Example 2 Dielectric Layer Coating b weight (g) | Preparation Example 3 Dielectric Layer Coating c weight (g) | Preparation Example 4 Dielectric Layer Coating d weight (g) |
|---|---|---|---|---|
| silver powders (mean particle size: 4 μm) | 20.00 | 20.00 | 20.00 | 20.00 |
| m-cresol | 11.70 | 11.70 | 11.70 | 11.70 |
| trimethoxyphenylsilane solution | 10.50 | | 10.50 | 10.50 |
| tris(2-ethylhexyl) phosphate solution | | 10.50 | | |
| PI-A | 33.33 | | | |
| PI-B | | 33.33 | | |
| PI-C | | | 33.33 | |
| PI-D | | | | 33.33 |
| total weight (g) | 75.53 | 75.53 | 75.53 | 75.53 |
| solid content (%) | 41.1% | 41.1% | 41.1% | 41.1% |
| amount of silver powders in the Dielectric Layer Coating | 64.4% | 64.4% | 64.4% | 64.4% |
| viscosity (cP, 25° C.) | 21,469 | 22,259 | 21,830 | 21,625 |

[Preparation of Dielectric Layer Coating]

Each of Dielectric Layer Coating a to Dielectric Layer Coating d was coated on an untreated surface of a PET (thickness: 50 μm; BD216, Nan Ya) substrate using a scraper with a gap of 50 μm and with a width of 150 mm and a coater (ZAA2300, ZEHNTNER) with parallel-movement function. The sample was transferred into an oven and baked at 150° C. for 30 minutes. Then, the sample was moved from the oven and cooled down to room temperature. As such, dielectric layers with PET substrates were obtained. In summary, Dielectric Layer A, Dielectric Layer B, Dielectric Layer C, and Dielectric Layer D are formed of Dielectric Layer Coating a, Dielectric Layer Coating b, Dielectric Layer Coating c, and Dielectric Layer Coating d prepared as described above, respectively.

[Tests and Measurements of Dielectric Layer]

[Film Formability]

After each of the Dielectric Layers was formed on the PET substrates, the film formability of each of Dielectric Layer A to Dielectric Layer D was inspected by eyes whether the Dielectric Layer did form a continuous film on the PET substrate.

[Appearance Integrity]

The baked Dielectric Layer was peeled off from the PET substrate. After the peeling, the appearance of the baked Dielectric Layer was inspected by eyes whether it was intact without being damaged.

[Average Thickness]

The thickness of the Dielectric Layer peeled off from the PET substrate was measured on 10 points using a micrometer (Micrometer, MITUTOYO IP65). The average thickness of the Dielectric Layer was determined by averaging the thickness values of the 10 points.

[Average Dielectric Constant and Average Dielectric Loss]

Two hollow circular metal plates having the same shape and the same sizes were prepared, wherein each of the metal plates had a diameter of 18 mm, a thickness of 1 mm, and a diameter of the hollow center of 8 mm. The Dielectric Layer was cut into a square of about 18 mm×18 mm. The square Dielectric Layer was sandwiched between the two metal plates and the two metal plates were well aligned. As such, the Dielectric Layer was exposed by the hollow centers of the two metal plates. The exposed circular areas of the Dielectric Layer had a diameter of 8 mm at each side. Then, the two metal plates were fixed using tapes, such that the two metal plates and the Dielectric Layer could not be moved. The exposed circular areas at two sides of the Dielectric Layer were coated with gold using a gold target and a sputter coater (AGB7340, Agar Scientific) to completely cover the exposed areas at two surfaces of the Dielectric Layer. The sputtering conditions were set with a vacuum degree of less than 0.2 mbar, a current of 35 mA, and sputtering time of 40 seconds. Then, the two metal plates were separated, and the Dielectric Layer was taken out. As such, an Au-coated Dielectric Layer sample for measurements of dielectric constant and dielectric loss was obtained.

The circular surface areas coated with gold of the Au-coated Dielectric Layer sample was measured using a dielectric tester (6630-1, MICROTEST CORP.) and a FX-000C12 measuring fixture with a measuring frequency of 100 Hz.

Two more Au-coated Dielectric Layer samples were made and the dielectric constant and dielectric loss thereof were measured in the same manner. The average dielectric constant and the average dielectric loss of the Dielectric Layer were determined by averaging the measurement results of the three samples.

EXAMPLES AND COMPARATIVE EXAMPLES

In Example 1, Example 2, Example 3, and Comparative Example 1, Dielectric Layer A, Dielectric Layer B, Dielectric Layer C, and Dielectric Layer D were correspondingly prepared, and their properties were tested and measured as described above, including the film formability of the Dielectric Layers after being dried on the PET substrates, the appearance integrity of the dried Dielectric Layers after being peeled off from the PET substrates, the average thickness of the Dielectric Layers, and the average dielectric constants (Dk) and the average dielectric losses (Df) at 100 Hz. The details of the test and measuring results are listed in Table 3.

TABLE 3

| | Example 1 Dielectric Layer A | Example 2 Dielectric Layer B | Example 3 Dielectric Layer C | Comparative Example 1 Dielectric Layer D |
|---|---|---|---|---|
| amount of the monomers having the ether linkages among all the monomers | 53.2% | 52.7% | 100.0% | 42.3% |
| amount of silver powders in the Dielectric Layer Coating | 64.4% | 64.4% | 64.4% | 64.4% |
| film formability | a film is formed continuously on the PET substrate | a film is formed continuously on the PET substrate | a film is formed continuously on the PET substrate | a film is formed continuously on the PET substrate |
| appearance integrity | the film is intact without being damaged | the film is intact without being damaged | the film is intact without being damaged | the film has cracks |
| average thickness (μm) | 10.1 | 10.3 | 10.5 | 10.2 |
| average Dk (100 Hz) | 25.537 | 26.120 | 28.255 | 26.288 |
| average Df (100 Hz) | 0.351 | 0.306 | 0.359 | 0.085 |

Example 1 shows that Dielectric Layer A formed a continuous film after being dried on the PET substrate, and the dried Dielectric Layer was intactly peeled off from the PET substrate without being damaged. This is because, among all the monomers of the polyimide, 53.2% of the monomers comprise the ether linkages in their backbones, and thus the structure of Dielectric Layer A is tougher. Example 2 and Example 3 show similar results to Example 1.

Comparative Example 1 shows that Dielectric Layer D was not intactly peeled off from the PET substrate. This is because, among all the monomers of the polyimide, only 42.3% of the monomers comprise the ether linkages in their backbones, and thus the structure of Dielectric Layer D is stiffer.

In summary, when more components in the polyimide structure have the ether linkages, the toughness of the polyimide is better, and the polyimide is more suitable for forming rolls and it is less likely to crack. Accordingly, when the polyimide comprises more diamine and dianhydride monomer units (with the ether linkages), the polyimide is more suitable to serve as the matrix for thin film capacitors.

[Effect of Conductive Particles]

[Preparation of Dielectric Layer Coating]

Referring to Table 4, according to the proportions of Preparation Example 5 to Preparation Example 9, Dielectric Layer Coating e to Dielectric Layer Coating i were prepared using Polyimide Solution PI-C in the same manner for preparing Dielectric Layer Coating a to Dielectric Layer Coating d as described above. Total weights, solid contents, the amounts of the silver powders, and viscosities at 25° C. of the dielectric layer coatings are also listed in Table 4.

TABLE 4

| | Preparation Example 5 Dielectric Layer Coating e weight (g) | Preparation Example 6 Dielectric Layer Coating f weight (g) | Preparation Example 7 Dielectric Layer Coating g weight (g) | Preparation Example 8 Dielectric Layer Coating h weight (g) | Preparation Example 9 Dielectric Layer Coating i weight (g) |
|---|---|---|---|---|---|
| silver powders (mean particle size: 4 μm) | | | 35.00 | | |
| silver powders (mean particle size: 0.5 μm) | 10.00 | | | | |
| silver powders (mean particle size: 20 nm) | | 1.2 | | 0.6 | |
| m-cresol | 11.70 | 11.70 | 11.70 | 11.70 | 11.70 |
| trimethoxy-phenylsilane solution | 7.00 | 2.4 | 15.80 | 1.2 | |
| PI-C | 33.33 | 33.33 | 33.33 | 33.33 | 33.33 |
| total weight (g) | 62.03 | 48.63 | 95.83 | 46.83 | 45.03 |
| solid content (%) | 33.4% | 23.5% | 48.6% | 22.9% | 22.2% |

TABLE 4-continued

| | Preparation Example 5 Dielectric Layer Coating e weight (g) | Preparation Example 6 Dielectric Layer Coating f weight (g) | Preparation Example 7 Dielectric Layer Coating g weight (g) | Preparation Example 8 Dielectric Layer Coating h weight (g) | Preparation Example 9 Dielectric Layer Coating i weight (g) |
|---|---|---|---|---|---|
| amount of silver powders in the Dielectric Layer Coating | 48.3% | 10.5% | 75.1% | 5.6% | 0% |
| viscosity (cP, 25° C.) | 21,748 | 21,258 | 21,814 | 21,163 | 22,024 |

[Preparation of Dielectric Layers]

Dielectric Layer E to Dielectric Layer I were formed of Dielectric Layer Coating e to Dielectric Layer Coating I, respectively, in the same manner for preparing Dielectric Layer A to Dielectric Layer D as described above.

[Tests and Measurements of Dielectric Layer]

Dielectric Layer E to Dielectric Layer I were tested and measured in the same manner for testing and measuring Dielectric Layer A to Dielectric Layer D as described above.

[Windability]

The windability of each of Dielectric Layer E to Dielectric Layer I was tested. Firstly, each of Dielectric Layer E to Dielectric Layer I was cut into a square of about 30 mm×30 mm. The square Dielectric Layer was winded to form a roll by hands. The roll had a length of about 30 mm and a cross-sectional diameter of about 5 mm. Then, the roll was loosened and returned to its original square shape. Whether the square Dielectric Layer did crack was inspected with eyes.

EXAMPLES AND COMPARATIVE EXAMPLES

In Example 4, Example 5, Example 6, Comparative Example 2, Comparative Example 3, and Comparative Example 4, Dielectric Layer C, Dielectric Layer E, Dielectric Layer F, Dielectric Layer G, Dielectric Layer H, and Dielectric Layer I were correspondingly prepared, and their properties were tested and measured as described above, including the film formability of the Dielectric Layers after being dried on the PET substrates, the appearance integrity of the dried Dielectric Layers after being peeled off from the PET substrates, the average thickness of the Dielectric Layers, the average dielectric constants (Dk) and the average dielectric losses (Df) at 100 Hz, and the windability. The details of the test and measuring results are listed in Table 5.

TABLE 5

| | Example 4 Dielectric Layer C | Example 5 Dielectric Layer E | Example 6 Dielectric Layer F | Comparative Example 2 Dielectric Layer G | Comparative Example 3 Dielectric Layer H | Comparative Example 4 Dielectric Layer I |
|---|---|---|---|---|---|---|
| amount of the monomers having the ether linkages among all the monomers | 100.0% | 100.0% | 100.0% | 100.0% | 100.0% | 100.0% |
| amount of silver powders in the Dielectric Layer Coating | 64.4% (mean particle size: 4 μm) | 48.3% (mean particle size: 0.5 μm) | 10.5% (mean particle size: 20 nm) | 75.1% (mean particle size: 4 μm) | 5.6% (mean particle size: 20 nm) | 0% |
| film formability | a film is formed continuously on the PET substrate | a film is formed continuously on the PET substrate | a film is formed continuously on the PET substrate | a film is formed continuously on the PET substrate | a film is formed continuously on the PET substrate | a film is formed continuously on the PET substrate |
| appearance integrity | the film is intact without being damaged | the film is intact without being damaged | the film is intact without being damaged | the film has cracks | the film is intact without being damaged | the film is intact without being damaged |
| windability | the film is wound without cracks being seen | the film is wound without cracks being seen | the film is wound without cracks being seen | the film has cracks when it is wound | the film is wound without cracks being seen | the film is wound without cracks being seen |
| average thickness (μm) | 10.5 | 9.9 | 10.3 | 9.9 | 9.8 | 10.2 |
| average Dk (100 Hz) | 28.255 | 25.087 | 8.393 | 56.375 | 5.281 | 3.941 |
| average Df (100 Hz) | 0.359 | 0.134 | 0.088 | 1.036 | 0.072 | 0.008 |

Example 4, Example 5, and Example 6 show that Dielectric Layer C, Dielectric Layer E, and Dielectric Layer F are suitable for thin film capacitors. As to the mechanical properties, Dielectric Layer C, Dielectric Layer E, and Dielectric Layer F form continuous films after being dried, intactly peeled off from the PET substrates without being damaged, and are wound without cracks. As to the electrical properties, Dielectric Layer C, Dielectric Layer E, and Dielectric Layer F have Dk equal to or larger than 8 and Df smaller than 1. This is because, in Dielectric Layer C, Dielectric Layer E, and Dielectric Layer F, 100% of the monomers of the polyimide comprise the ether linkages in their backbones, and the amounts of the silver powders are 10% to 70%.

Comparative Example 2 shows that the amount of the silver powders in Dielectric Layer G is over 70%, such that the film is brittle, and thus the film is not intactly peeled off from the PET substrate, and the cracks form during winding.

Comparative Example 3 shows that the amount of the silver powders in Dielectric Layer H is lower than 10%, and thus Dk is smaller than 6.

[Feasibility of Roll Capacitor]

[Preparation of Roll Capacitor]

A 30 mm length×30 mm width Dielectric Layer (with a thickness of about 10 μm) and a 30 mm length×30 mm width foil (with a thickness of about 20 μm; MW-G, Taiwan Copper Foil Co., Ltd.) were stacked, and wound to form a roll with the Dielectric Layer at an inner side. As such, a roll capacitor (roll-type thin film capacitor) could be obtained.

[Test of Roll Capacitor]

The roll capacitor was placed into a hot air circulation oven and heated at 300° C. for 30 min. Then, the roll capacitor was moved from the oven and cooled down to room temperature. The roll capacitor was unrolled by hands. The adhesion properties between the Dielectric Layer and the copper foil were inspected with eyes.

EXAMPLES AND COMPARATIVE EXAMPLES

[Examples and Comparative Examples]

In Example 7, Example 8, Example 9, and Comparative Example 5, roll capacitors were prepared using Dielectric Layer A, Dielectric Layer B, Dielectric Layer C, and Dielectric Layer D, respectively, and their properties were tested as described above.

In Example 7, Example 8, Example 9, and Comparative Example 5, the feasibility of the Dielectric Layer to be used in the manufacture of roll capacitors were tested, and their properties were tested and measured as described above. The details of the test are listed in Table 6.

TABLE 6

| | Example 7 Roll Capacitor A | Example 8 Roll Capacitor B | Example 9 Roll Capacitor C | Comparative Example 5 Roll Capacitor D |
|---|---|---|---|---|
| amount of the monomers having the ether linkages among all the monomers | 53.2% | 52.7% | 100.0% | 42.3% |
| amount of silver powders in the Dielectric Layer Coating | 64.4% | 64.4% | 64.4% | 64.4% |

TABLE 6-continued

| | Example 7 Roll Capacitor A | Example 8 Roll Capacitor B | Example 9 Roll Capacitor C | Comparative Example 5 Roll Capacitor D |
|---|---|---|---|---|
| average thickness of the Dielectric Layer (μm) | 10.1 | 10.3 | 10.5 | 10.2 |
| average thickness of the copper foil (μm) | 20 | 20 | 20 | 20 |
| adhesion property between the Dielectric Layer and the copper foil | adhesion | adhesion | adhesion | no adhesion |

Example 7, Example 8, and Example 9 show that, in Roll Capacitor A, Roll Capacitor B, and Roll Capacitor C, the Dielectric Layer can be adhered to the copper foil. This is because, in Dielectric Layer A, Dielectric Layer B, and Dielectric Layer C, 50~100% of the monomers of the polyimide comprise the ether linkages in their backbones, and thus the structures of the Dielectric Layers are softer, and exhibit good adhesion at 300° C.

Comparative Example 5 shows that, in Roll Capacitor D, the Dielectric Layer cannot be adhered to the copper foil. This is because, in Dielectric Layer D, only 42.3% of the monomers of the polyimide comprise the ether linkages in their backbones, the structure of the polyimide is stiffer, and thus Dielectric Layer D is less likely to soften at 300° C. to improve the adhesion.

Example 1 to Example 9 can prove that when a dielectric layer comprises polyimide and conductive particles, the polyimide comprises ether linkages, a total amount of monomer units comprising the ether linkages is 50 weight parts to 100 weight parts based on 100 weight parts of the polyimide, and a total amount of the conductive particles is 10 weight parts to 70 weight parts based on 100 weight parts of the dielectric layer, the dielectric Layer has good toughness, its heat resistance, frost resistance, winding property, mechanical properties, processing properties, and the like can be improved, the dielectric constant of the dielectric layer can be up to 6 or more, and the dielectric loss can be less than 1. In addition, the dielectric layer can be used with a conductive layer (such as a copper foil) to form a roll capacitor, which improves the storage capacity of the roll capacitor and is beneficial for shrinking the roll capacitor.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A thin film capacitor, comprising:

a dielectric layer comprising polyimide, a dispersing agent, and metal particles, the polyimide comprising ether linkages, wherein based on 100 weight parts of the polyimide, a total amount of monomer units comprising the ether linkages is 50 weight parts to 100 weight parts, and wherein based on 100 weight parts of the dielectric layer, a total amount of the metal particles is 10 weight parts to 70 weight parts, and the metal particles are dispersed in a matrix of the polyimide with the dispersing agent; and a conductive layer disposed on a surface of the dielectric layer.

2. The thin film capacitor according to claim 1, wherein the polyimide comprises diamine monomer units and dianhydride monomer units, and the diamine monomer units and/or the dianhydride monomer units comprise the ether linkages.

3. The thin film capacitor according to claim 2, wherein the diamine monomer units comprising the ether linkages are monomer units independently formed from monomers represented by Formula (1) or Formula (2):

Formula (1)

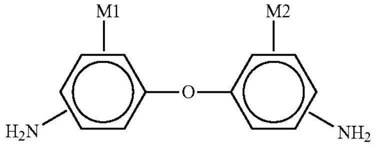

Formula (2)

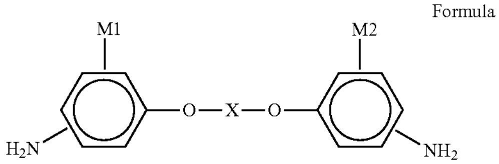

wherein in Formula (1), M1 and M2 are independently H, OR1, or R1, R1 is $C_nF_mH_{2n+1-m}$, n is an integer from 1 to 8, and m is an integer from 0 to 17; and wherein in Formula (2), M1 and M2 are independently H, OR1, or R1, R1 is $C_nF_mH_{2n+1-m}$, n is an integer from 1 to 8, m is an integer from 0 to 17, and X is represented by any of Formula (2-1) to Formula (2-8):

Formula (2-1)

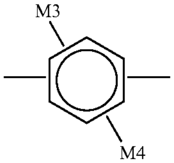

Formula (2-2)

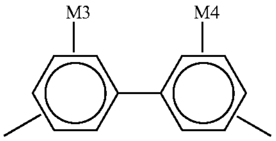

Formula (2-3)

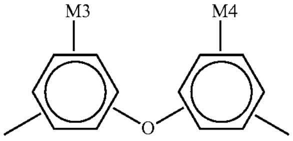

Formula (2-4)

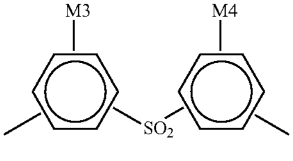

-continued

Formula (2-5)

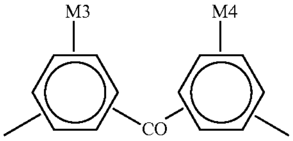

Formula (2-6)

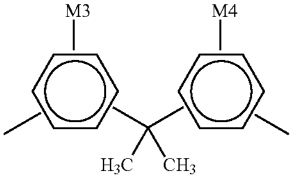

Formula (2-7)

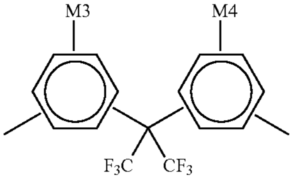

Formula (2-8)

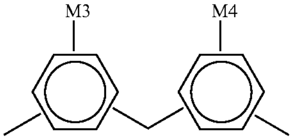

wherein in each of Formula (2-1) to Formula (2-8), M3 and M4 are independently H, OR1, or R1, R1 is $C_nF_mH_{2n+1-m}$, n is an integer from 1 to 8, and m is an integer from 0 to 17.

4. The thin film capacitor according to claim 2, wherein the dianhydride monomer units comprising the ether linkages are monomer units independently formed from monomers represented by Formula (3) or Formula (4):

Formula (3)

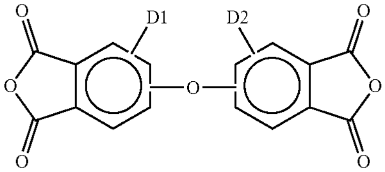

Formula (4)

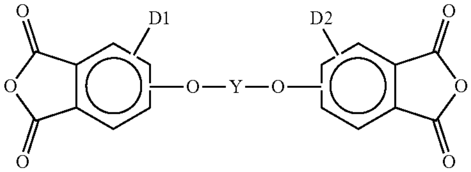

wherein in Formula (3), D1 and D2 are independently H, OR2, or R2, R2 is $C_nF_mH_{2n+1-m}$, n is an integer from 1 to 8, and m is an integer from 0 to 17; and wherein in Formula (4), D1 and D2 are independently H, OR1, or R2, R2 is $C_nF_mH_{2n+1-m}$, n is an integer from 1 to 8, m is an integer from 0 to 17, and Y is represented by any of Formula (4-1) to Formula (4-8):

Formula (4-1)

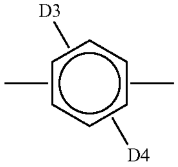

Formula (4-2)

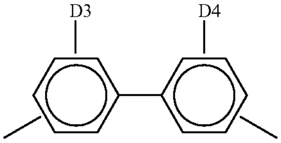

Formula (4-3)

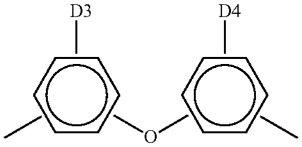

Formula (4-4)

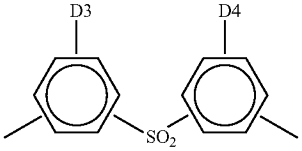

Formula (4-5)

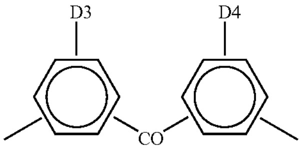

Formula (4-6)

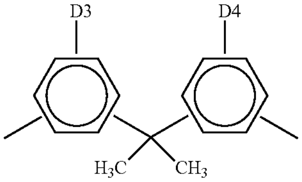

Formula (4-7)

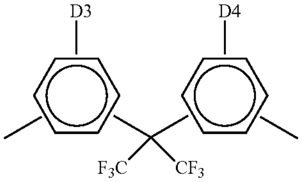

-continued

Formula (4-8)

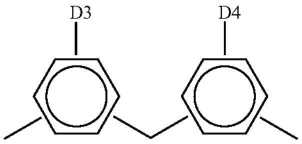

wherein in each of Formula (4-1) to Formula (4-8), D3 and D4 are independently H, OR2, or R2, R2 is $C_nF_mH_{2n+1-m}$, n is an integer from 1 to 8, and m is an integer from 0 to 17.

5. The thin film capacitor according to claim 2, wherein the ether linkages are included in backbones of the diamine monomer units and/or the dianhydride monomer units.

6. The thin film capacitor according to claim 2, wherein the diamine monomer units comprise monomer units formed from at least one of diaminodiphenyl ether, 4,4'-diamino-2-(trifluoromethyl)diphenyl ether, 4,4'-diamino-2-(trifluoromethoxyl)diphenyl ether, 4,4'-diamino-2,2'-bis(trifluoromethyl) diphenyl ether, 4,4'-diamino-2,2'-bis (trifluoromethoxyl) diphenyl ether, bis(4-aminophenoxy) benzene, 1,3-bis(3-aminophenoxy)benzene, 1,4-bis {4-amino-2-(trifluoromethyl) phenoxy}benzene, 1,4-bis(4-aminophenoxy)-2,5-di-t-butylbenzene, 2,2-bis {4-(4-aminophenoxy)phenyl}propane, 2,2-bis {4-(4-aminophenoxy) phenyl}methane, 2,2-bis {4-(4-aminophenoxy) phenyl}hexafluoropropane, 2,2-bis[4-{4-amino-2-(trifluoromethyl) phenoxy}phenyl]hexafluoropropane, 2,2-bis[4-{4-amino-2-(trifluoromethoxyl) phenoxy}phenyl] hexafluoropropane, 4,4'-bis(4-aminophenoxy) biphenyl, bis {4-(aminophenoxy)phenyl}sulfone, or bis {4-(4-aminophenoxy)phenyl}ketone, and the dianhydride monomer units comprise monomer units formed from at least one of oxydiphthalic anhydride, oxydimethylphthalic anhydride, bisphenol A dianhydride, tetramethyl bisphenol A dianhydride, bisphenol F dianhydride, or tetramethyl bisphenol F dianhydride.

7. The thin film capacitor according to claim 1, wherein the polyimide is a polyimide soluble in an organic solvent.

8. The thin film capacitor according to claim 1, wherein the metal particles comprise at least one of Au, Ag, Cu, Fe, Co, Ni, Al, Mn, Zn, Pb, Mg, or Ti, and the metal particles have particle sizes from 10 nm to 5 μm.

9. The thin film capacitor according to claim 1, wherein the dispersing agent comprises a coupling agent and an organic dispersing agent.

10. The thin film capacitor according to claim 1, formed as a roll with a two-layered structure of the dielectric layer and the conductive layer.

* * * * *